(12) United States Patent
Obrist et al.

(10) Patent No.: US 9,559,387 B2
(45) Date of Patent: Jan. 31, 2017

(54) BATTERY

(71) Applicant: Obrist Powertrain GmbH, Lustenau (AT)

(72) Inventors: Frank Obrist, Bregenz (AT); Martin Graz, Lustenau (AT); Peter Giese, Herzogenaurach (DE); Oliver Obrist, Dornbirn (AT)

(73) Assignee: OBRIST TECHNOLOGIES GMBH, Lustenau (AT)

( * ) Notice: Subject to any disclaimer, the term of this patent is extended or adjusted under 35 U.S.C. 154(b) by 270 days.

(21) Appl. No.: 14/099,343

(22) Filed: Dec. 6, 2013

(65) Prior Publication Data

US 2014/0178737 A1   Jun. 26, 2014

(30) Foreign Application Priority Data

Dec. 7, 2012  (EP) .................................. 12196193

(51) Int. Cl.
*H01M 10/613* (2014.01)
*H01M 10/42* (2006.01)
(Continued)

(52) U.S. Cl.
CPC ....... *H01M 10/4207* (2013.01); *H01M 2/1077* (2013.01); *H01M 2/1094* (2013.01); *H01M 10/613* (2015.04); *H01M 10/615* (2015.04); *H01M 10/617* (2015.04); *H01M 10/625* (2015.04); *H01M 10/643* (2015.04); *H01M 10/653* (2015.04); *H01M 10/658* (2015.04); *H01M 10/6553* (2015.04); *H01M 10/6554* (2015.04); *H01M 10/6556* (2015.04);
(Continued)

(58) Field of Classification Search
None
See application file for complete search history.

(56) References Cited

U.S. PATENT DOCUMENTS

| 4,517,263 A | 5/1985 | Reiss et al. |
|---|---|---|
| 5,205,348 A | 4/1993 | Tousignant et al. |

(Continued)

FOREIGN PATENT DOCUMENTS

| CN | 102057519 A | 5/2011 |
|---|---|---|
| DE | 2257723 | 5/1973 |

(Continued)

OTHER PUBLICATIONS

European Search Report dated Jul. 15, 2013 for the Corresponding European Patent Application No. EP 12196193.2.

(Continued)

*Primary Examiner* — Patrick Ryan
*Assistant Examiner* — Christopher Domone
(74) *Attorney, Agent, or Firm* — Hassan Abbas Shakir; Katten Muchin Rosenman LLP

(57) ABSTRACT

The battery has rod cells, which are arranged next to one another in multiple rows and the end-side electrical contacts of which are respectively electrically connected to one another in parallel and in series by a common contact plate. For effective cooling, a flat heat exchange pocket, through which a heat transfer medium flows, abuts against these contact plates. This heat exchange pocket consists of a multilayered thin film having an electrically insulating outer layer.

22 Claims, 5 Drawing Sheets

(51) Int. Cl.
  *H01M 2/10* (2006.01)
  *H01M 10/625* (2014.01)
  *H01M 10/6553* (2014.01)
  *H01M 10/615* (2014.01)
  *H01M 10/653* (2014.01)
  *H01M 10/6556* (2014.01)
  *H01M 10/643* (2014.01)
  *H01M 10/6554* (2014.01)
  *H01M 10/617* (2014.01)
  *H01M 10/658* (2014.01)
  *H01M 10/6557* (2014.01)
  *H01M 10/6567* (2014.01)
  *H01M 10/6555* (2014.01)

(52) U.S. Cl.
  CPC .... *H01M 10/6555* (2015.04); *H01M 10/6557* (2015.04); *H01M 10/6567* (2015.04)

(56) References Cited

U.S. PATENT DOCUMENTS

| | | | | |
|---|---|---|---|---|
| 6,329,098 | B1* | 12/2001 | Bliesner | C25C 3/02 429/103 |
| 2009/0297892 | A1* | 12/2009 | Ijaz | B23K 26/243 429/7 |
| 2012/0183823 | A1* | 7/2012 | Von Borck | H01M 2/1061 429/81 |
| 2014/0113171 | A1* | 4/2014 | Schaefer | H01M 2/1077 429/120 |

FOREIGN PATENT DOCUMENTS

| | | |
|---|---|---|
| DE | 102006059989 | 6/2008 |
| DE | 202007017390 | 4/2009 |
| DE | 102009033076 | 1/2011 |
| DE | 102011017375 | 1/2012 |
| GB | 956553 | 4/1964 |
| JP | 4176911 | 8/2008 |
| JP | 4176911 | 11/2008 |

OTHER PUBLICATIONS

European Office Action dated Aug. 16, 2013 for the Corresponding European Patent Application No. EP 12196193.2.
International Search Report dated Apr. 29, 2014 for the Corresponding International Patent Application No. WO PCT/EP2013/075843.
File History of U.S. Appl. No. 14/099,337, discussed by Examiner in Office Action of Jun. 5, 2016.
Office Action dated Dec. 3, 2015, issued in counterpart Chinese patent application No. 201310659595.7.

* cited by examiner

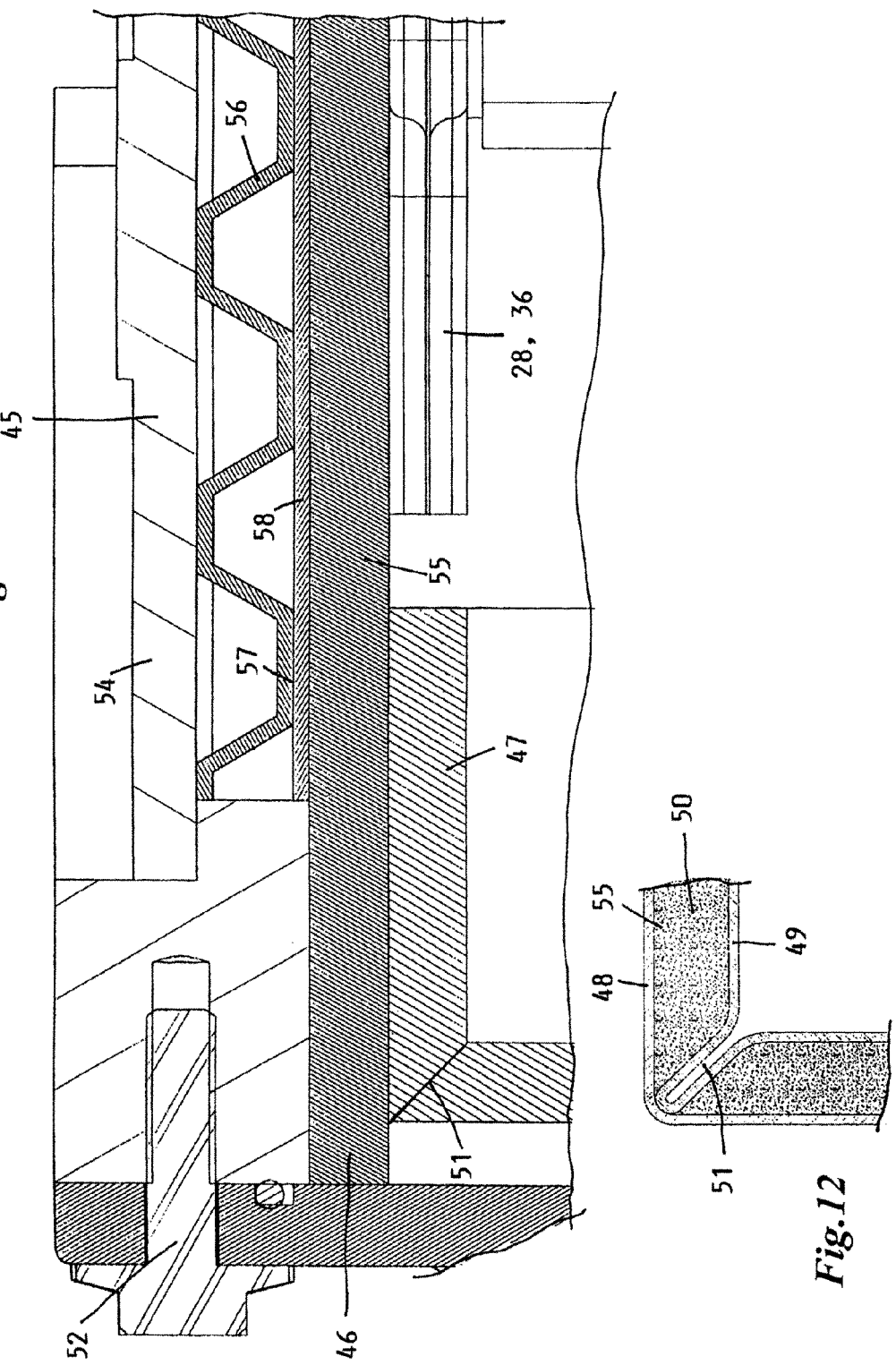

BATTERY

CROSS-REFERENCE TO RELATED APPLICATIONS

This application claims priority to European application No. 12196193.2, filed Dec. 7, 2012, which is hereby incorporated by reference in its entirety.

BACKGROUND OF THE INVENTION

1. Field of the Invention

The invention relates to a battery comprising rod cells, which are arranged next to one another in multiple rows, are electrically connected to one another in parallel and in series to form at least one cell block and are in thermally conducting contact with at least one cooling element.

2. Description of the Related Art

It is known from DE102006059989 to cool rod cells of a battery that have a round cross section by contact of their casing with heat conducting elements produced as castings, which extend between the rod cells from a common base plate, in one piece with said plate. In this case, this base plate is for its part cooled by a cooling coil which extends in the plane thereof.

Further exemplary embodiments of batteries in which rod cells are cooled by way of the surface of their casing are known from DE102009033076, DE102011017375 or JP4176911.

These known batteries illustrate the relatively great structural complexity involved in the production of a thermally conducting contact of a heat exchanger with the surface of the casing or a region of the surface of the casing of the rod cells in order to prevent their overheating.

SUMMARY OF THE INVENTION

The invention is based on the object of finding a battery of the type mentioned that has a highly effective heat exchange system and a great mechanical resistance and can nevertheless be produced as a mass product particularly easily, and consequently at low cost.

The way in which the object is achieved according to the invention is that end-side electrical contacts of a row of rod cells extending over a width of a battery are respectively electrically connected to one another in parallel by a common contact plate and these contact plates are in heat-conducting connection with a flat heat exchanger, which extends parallel to said plates and through which liquid flows.

The electrical and mechanical connection of the contacts of the rod cells to the contact plate may take place in a highly productive way by spot laser welding, in a way corresponding to the scanner welding technique, for example by way of four welding locations respectively at each end of the rod cells.

The invention is based inter alia on the recognition that the required cooling of the rod cells is much more effective if this takes place directly by way of their two metallic end regions, i.e. their poles, instead of by way of the surface of their casing, which has a plastic coating, since, in a way corresponding to the generally known internal construction, these end regions are in electrically conducting, and consequently also good thermally conducting, connection with large-area inner metal foils, forming the cathode and anode.

In a preferred embodiment of the invention, such a heat exchanger is in direct contact with the electrically connecting contact plate and for this purpose is produced as a heat exchange pocket from a multilayered film material having an electrically insulating outer layer.

In comparison with castings in plate form or grid form of the cited prior art, such a heat exchanger, extending over at least one row of rod cells, can be produced much more easily by punching out from pieces of film in a way corresponding to the desired shape and size thereof, mutual arrangement thereof, lying one above the other, and welding along the edges thereof.

The production from a film material also ensures good heat-conducting, flexible contact of the heat exchanger abutting against one or more electrical contact plates of said type running parallel to one another.

The electrical contact plates respectively provided at both ends of the rod cells can be easily punched out in a suitable shape and size from a metal sheet with good conduction and corrosion resistance, such as for example from a sheet of iron having a metallic outer corrosion protection.

In order to avoid damage to the sheet material of the heat exchanger, the punched-out contact plates are arranged in such a way that the punched burr is on the side facing away from the heat exchanger.

In a preferred embodiment of the invention, a flow directing grid is enclosed between the two film walls of the heat exchanger, in order to distribute the heat transfer medium over the inner surfaces of the heat exchanger in an optimum way for heat exchange as it flows through from the inlet region to the outlet region. Furthermore, the flow directing grid serves as a spacer for the film walls of the heat exchanger.

Also preferably provided parallel to the heat exchanger produced from film material is a pressure pocket, which is at least approximately of a corresponding size. After filling the pressure pocket with a compressible medium, such as for example air or nitrogen, and the sealed closing thereof, the heat exchanger abuts firmly against at least one of the electrical contact plates under the filling pressure of the pressure pocket, so that good heat conduction to said plate and to the rod cells is ensured.

For uniform distribution of the pressure exerted by the pressure pocket, in a further embodiment of the invention a pressure distribution plate may be arranged between the pressure pocket and the heat exchanger.

BRIEF DESCRIPTION OF THE DRAWINGS

Further advantageous refinements of the invention can be taken from the patent claims and are described below on the basis of the drawings, in which:

FIG. 11 shows a vertical section through a battery with four cell blocks arranged one above the other, FIG. 12 shows an enlarged partial section through the battery as shown in FIG. 11 in the region XII thereof and

DETAILED DESCRIPTION OF THE DRAWINGS

Figure 1:
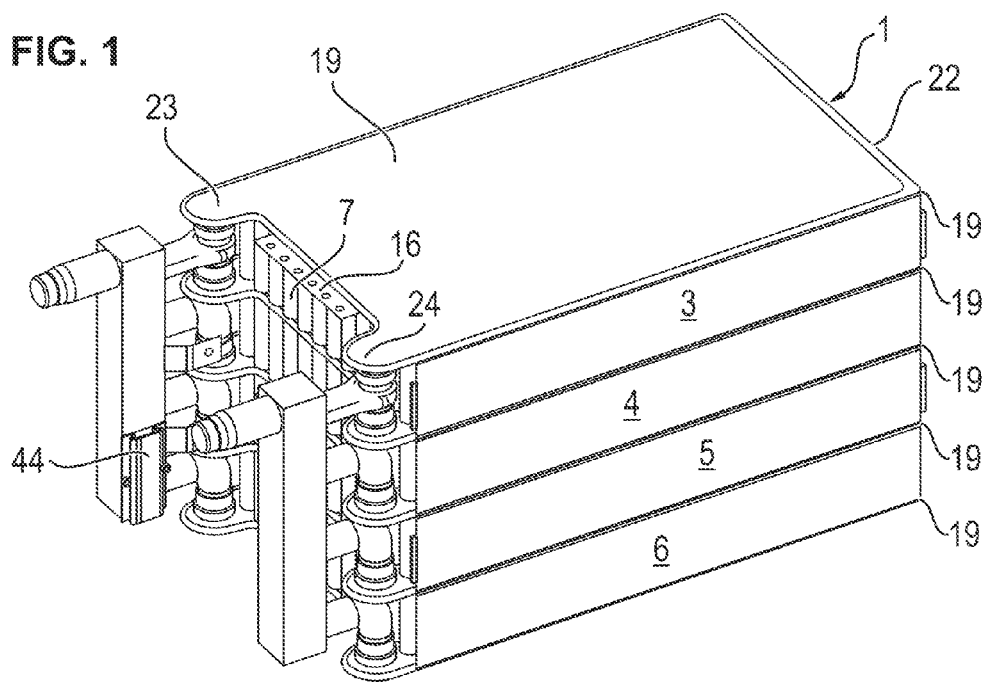
FIG. 1 shows a perspective representation of an internal construction of a battery with the housing shell omitted, and without lateral pressure pockets, with groups of rod cells arranged one above the other in four planes.
Figure 2:
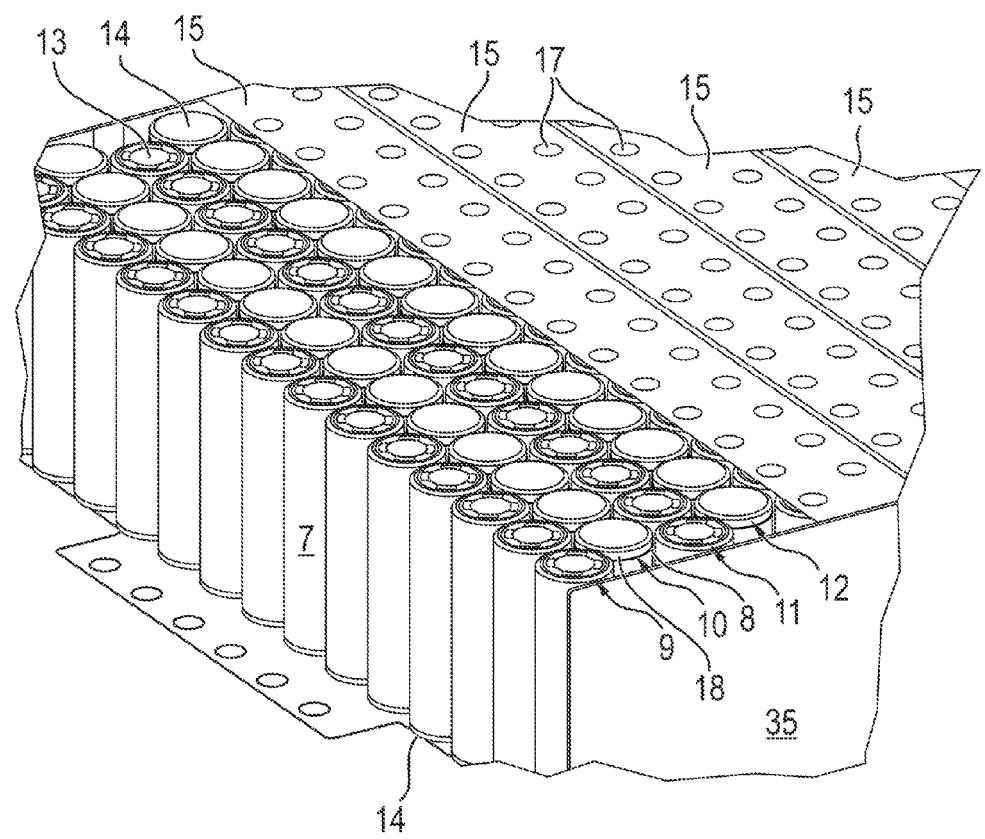
FIG. 2 shows rod cells arranged next to one another in multiple rows and in the same plane and partially connected by contact plates, in a perspective representation.
Figure 3:
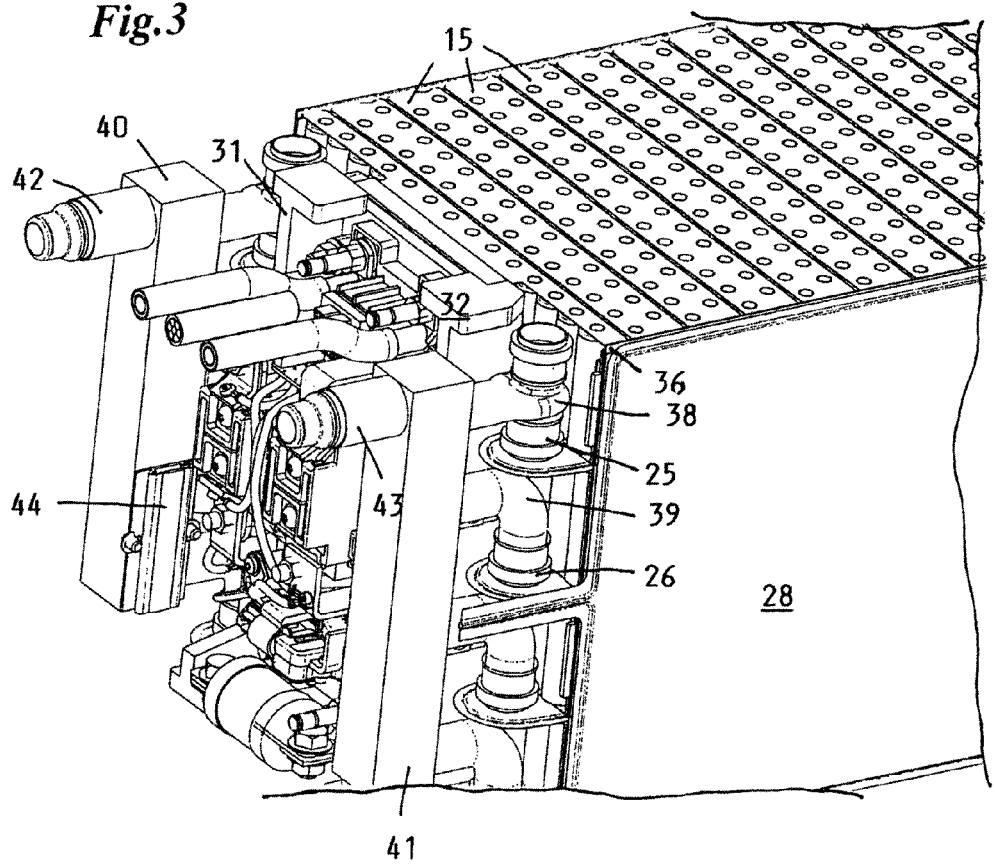
FIG. 3 shows a region of the representation as shown in FIG. 1 with the upper heat exchanger omitted and with a lateral pressure pocket.

A battery 1 according to the invention, which is represented in FIGS. 1 to 3 without a cladding and thermally insulating housing 2, has numerous electrical rod cells 7, respectively assembled in a common cell block 3-6. Such rod cells 7 are generally known and available from the retail trade. An exemplary embodiment is described in DE2257723. As lithium-ion cells, they have a particularly high electrical power capacity.

The arrangement of the rod cells 7 within a cell block 3-6 respectively takes place with a gap 8 between them, in multiple rows 9-12, preferably in such a way that the rod cells 7 of neighboring rows 9-12 are transversely offset in relation to one another, for a compact arrangement. In this case, the end-side poles 13, of the rod cells 7 of neighboring rows 9-12 are aligned oppositely in relation to one another for a connection electrically in series.

Said gap 8 between the numerous rod cells 7 allows their unhindered thermal expansion and allows tolerances with regard to their shape, alignment and arrangement when they are being ordered into rows to form a cell block 3-6.

A contact plate 15, extending respectively over two mutually parallel rows 9, 10 or 11, 12 of rod cells 7, connects them to one another on the one hand, in the direction of the respective row, electrically in parallel and also on the other hand, transversely thereto, electrically in series. The representation of FIG. 3 illustrates how consequently, for two rows respectively of rod cells 7, numerous elongated and correspondingly narrow contact plates 15 are arranged with an insulating spacing parallel to one another in the same plane.

Since rows 9-12 of rod cells 7 running parallel to one another in the same way (not represented) are also electrically connected to one another in parallel and in series on their underside or their opposite pole by a lower contact plate 15, the voltage values of the rows of cells add up together to form an overall value of the cell block 3-6 concerned. In this case, the rod cells 7 of the first row 9 of the cell block 3 are connected by a correspondingly narrower or strip-shaped contact plate, which by way of a lateral plate extension forms an end-side or beginning-side contact lug 16.

A connection with good electrical and thermal conduction and mechanical strength of the end-side poles 13, 14 of the rod cells 7 to the contact plates 15 extending respectively over the entire inner width of the battery 1 is performed at high speed by spot scanner welding, preferably by way of multiple welding spots 17, for example respectively four uniformly distributed over the contact area, so that the invention can also be realized at particularly low cost on account of the high operating speed of such a welding process.

The invention is based inter alia on the recognition that the required cooling of the rod cells 7 can be much improved if this takes place directly by way of their metallic end regions, i.e. their poles 13, 14, instead of by way of the surface of their casing, which has a plastic coating, since these end regions are in electrically conducting, and consequently also good thermally conducting, connection with large-area inner metal foils, forming the cathode and anode.

In order to prevent an overhanging edge region of a cell casing enclosing the rod cells 7 from hindering the contact with the contact plate 15, rod cells 7 in which the cell casing ends at a distance 18 from the flat pole 14 are used.

For the dissipation of the heat produced in the rod cells 7 under electrical loading of the battery 1 and also to maintain a minimum temperature for the operation thereof, the electrical contact plates 15 are in closely-abutting, heat-conducting contact with a heat exchange pocket 19. This pocket consists of two thin walls 21, 22, which run parallel to one another, are formed by a multilayered film material and are connected in a sealed manner to one another along their edges 20 by a peripheral weld seam.

To optimize its properties with regard to tear strength, material resistance, thermal conductivity, electrical insulation and weldability, a suitable film material for the production of the heat exchange pocket 19 consists of a laminate of different materials, such as for example aluminum, polyamide, polypropylene, and is available for various purposes from the retail trade with a film thickness of less than 0.2 mm.

On account of the preferred direct or close abutment against the electrical contact plates 15, a film material of which the outer layer has an electrically insulating effect should be used.

In order to prevent damage to this outer layer being caused by its abutment against the contact plates 15 and the side edges thereof, the latter are arranged such that the punched burr occurring when they are punched out is directed away from the heat exchange pocket 19, and consequently only the cross-sectionally rounded-off punched edge abuts against it.

As the representation in FIG. 1 shows, heat exchange pockets 19 extend on both sides over the entire upper side and underside of each cell block 3-6, so that the temperature of these and the rod cells 7 assembled in them is controlled on both sides by said pockets. Correspondingly, each of the heat exchange pockets 19 has for example the shape of a rectangle, corresponding to the shape of a horizontal cross section of a cell block 3-6.

In the region of two corner regions of the heat exchange pockets 19 lying opposite one another on the narrow sides, said pockets have approximately semi-circularly protruding continuations 23, 24 for the connection of connectors 25, 26, which are directed vertically in relation to the plane of the heat exchange pocket 19 concerned and are provided for the supply and removal, and consequently circulation, of a heat transfer medium through the heat exchange pockets 19.

In relation to a relatively small distance between the walls 21, 22 of the heat exchange pockets 19, allowing sufficient through-flow, for example of 2 mm, the flowed-through inside diameter of the connectors 25, 26 can consequently be made relatively large, so that a correspondingly high delivery rate of the heat transfer medium, and consequently a particularly effective heat exchange with small differences in temperature can be realized within the heat exchange pocket 19.

For a uniform flow distribution, conducive to the heat exchange, during the through-flow of the heat exchange pockets 19 from their inflow connectors 25 to their outflow connectors 26, provided between the two walls 2, 3 of the heat exchange pocket 19 is a flow directing grid 27, which consists of interconnected flow directing webs, so that longitudinally and transversely directed flow paths are bounded.

Such a flow directing grid 27 can be produced at low cost as an injection-molded part, for example from an aluminum alloy or from plastic, and during the production of the heat exchange pocket 19 be placed between the film walls 21, 22 thereof before they are welded to one another along the edges 20.

In addition to the internal pressure formed by the heat transfer medium flowing through, the flow directing grid 27 forms an inner support for the film walls 21, 22, which is for example 2 mm.

For uniform pressing of the heat exchange pockets 19 against the contact plates 15, and consequently a good heat-conducting contact and uniform compressive loading of the flow directing grid 27 enclosed therein, a pressure pocket 28 filled by a compressive medium, such as for example air or nitrogen, is provided, and a pressure distribution plate 29 provided between said pressure pocket and the heat exchange pocket 19 ensures a uniform pressure transfer to said distribution plate and to the ends of the rod cells 7. In this way, good temperature control and vibration-resistant securement are ensured for this plate. At the same time, the pressure pocket 28 is supported with its side facing away from the heat exchange pocket 19 on the inner surface of a thermally insulating inner wall 30 of the battery housing 2.

Figure 6:
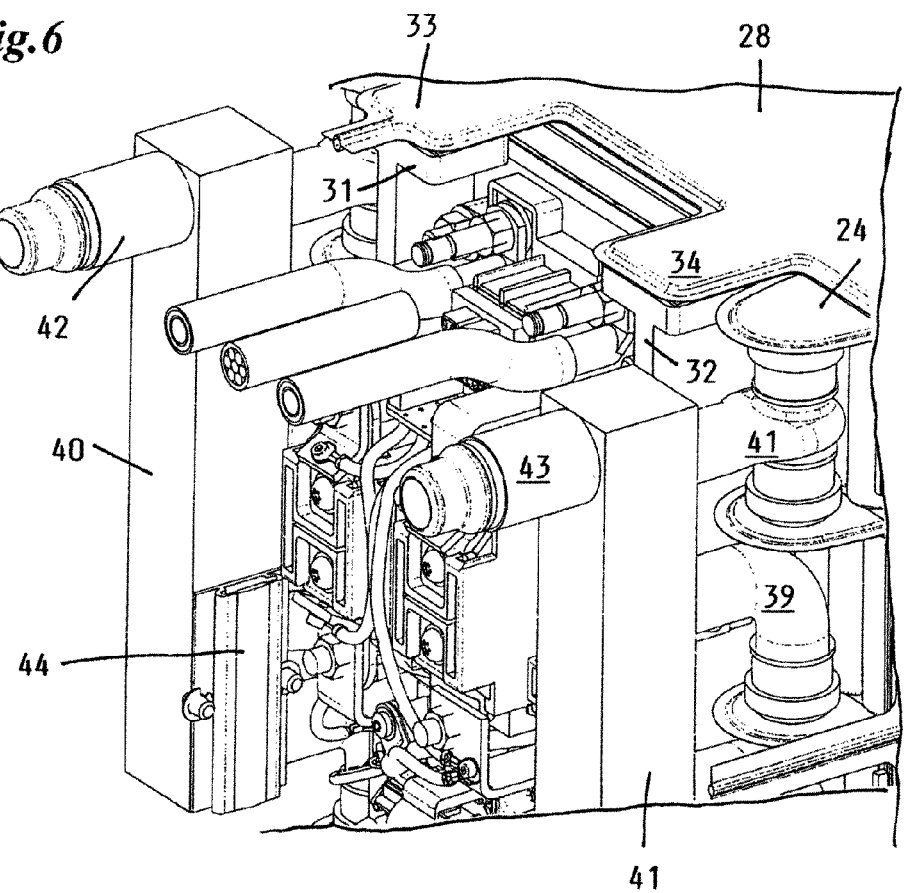
FIG. 6 shows a larger perspective representation of the connection region of the battery as shown in FIG. 5.
Figure 7:
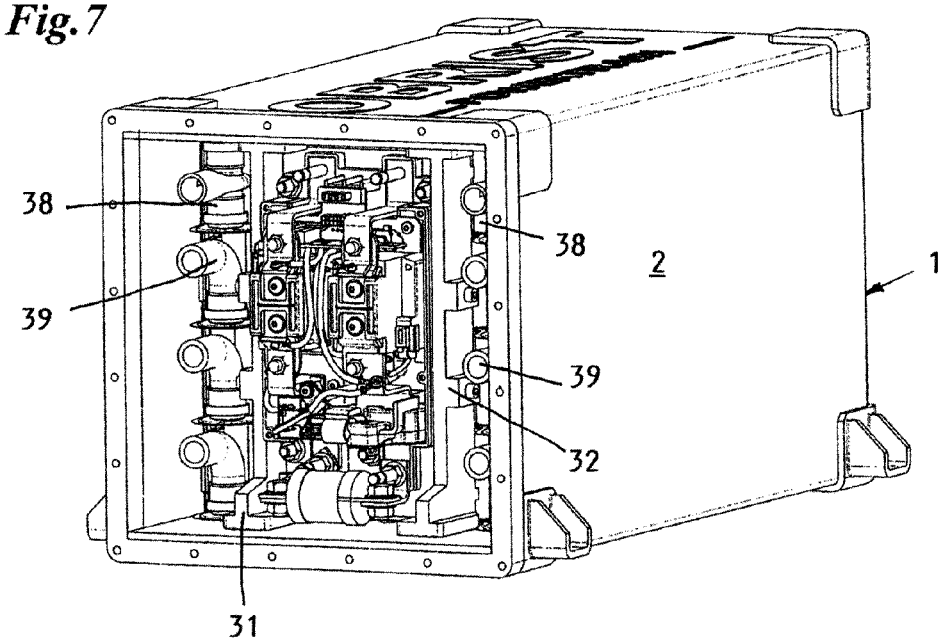
FIG. 7 shows a perspective representation of the housing of a battery as shown in FIGS. 1-6 with the connection-side closure wall removed.

In addition, the upper pressure pocket 28 serves for the bracing of supporting profiles 31, 32, to which electrical components of a battery control (BMS/Battery Management System) and connection components (25, 26) for the circulation of the heat transfer medium are fastened, so that the bracing together of these components with the cell blocks 3-6 prevents forces of inertia acting on the battery 1 from causing damage to the mechanical and electrical connections between the numerous components of the battery. For this purpose, this pressure pocket 28 has two pocket continuations 33, 34, which abut against the upper T-shaped end of these vertically aligned supporting profiles 31, 32. By their lower end, the supporting profiles 31, 32 are supported with a T-shaped end region on the lower wall of the battery housing or the lower lining thereof, as the representations of FIGS. 6 and 7 illustrate.

Figure 4:
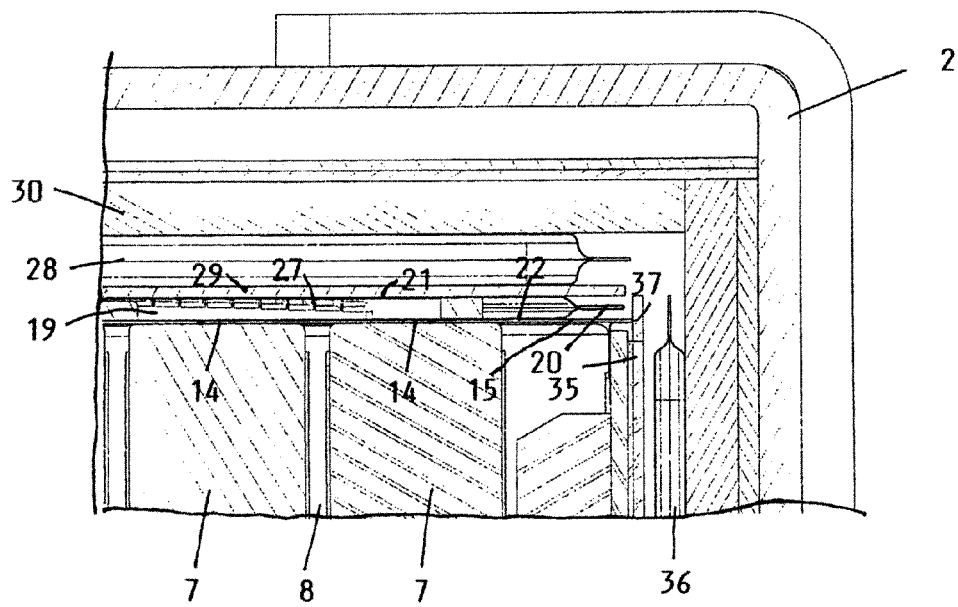
FIG. 4 shows a vertical section through a corner region of a battery according to the invention, including the housing shell thereof.
Figure 5:
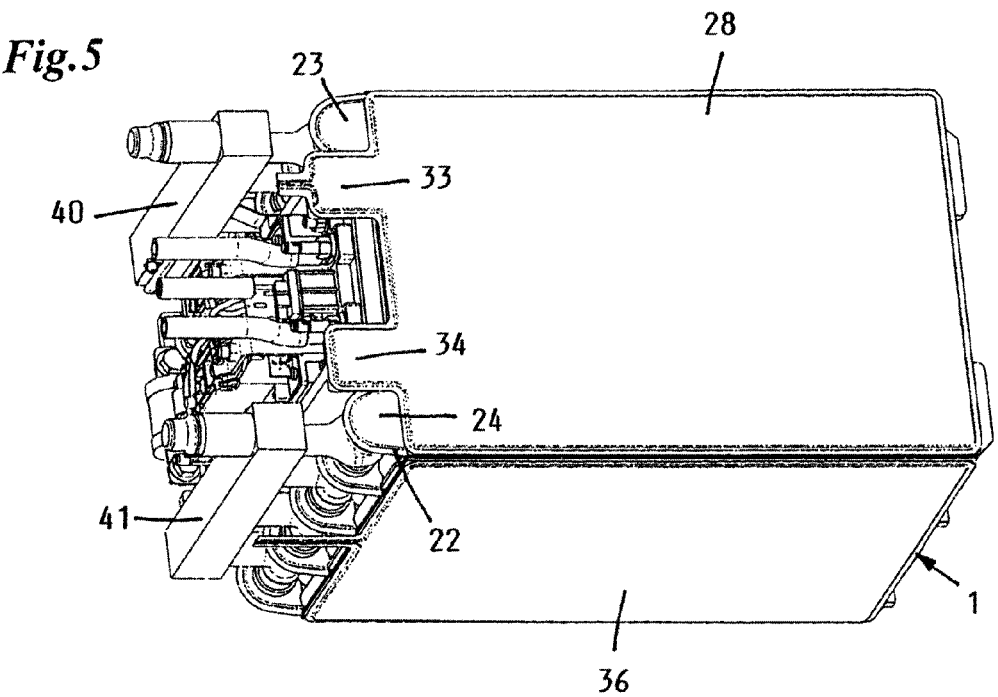
FIG. 5 shows a perspective representation of an internal construction of a battery corresponding to FIG. 1, with an additional upper and lateral pressure pocket.

A further pressure distribution plate 35 with an abutting pressure pocket 36 serves for the securing of the contact plates 15, and consequently the rod cells 7 connected to them by spot welding, in the direction of their plane, in that said pressure distribution plate abuts against the end edge 37 of said contact plates, as the partial sectional representation of FIG. 4 shows.

Figure 8:
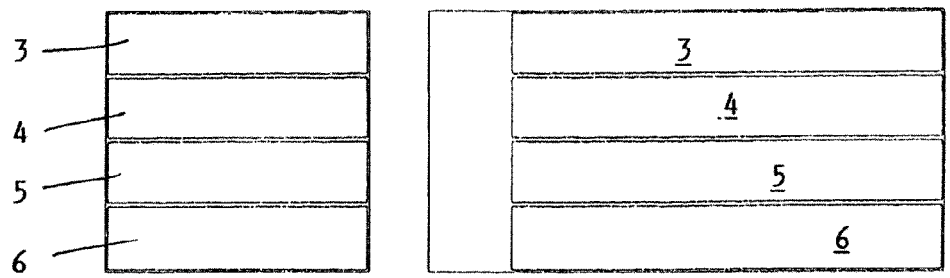
FIG. 8 shows a schematic representation of four cell blocks arranged one above the other in a view from the narrow side and from the long side.
Figure 9:
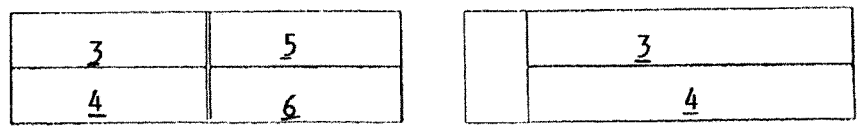
FIG. 9 shows a schematic representation of two cell blocks respectively arranged next to one another and one above the other, in two side views.
Figure 10:
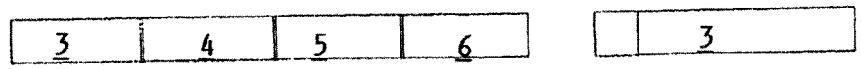
FIG. 10 shows a schematic representation of four cell blocks arranged in series next to one another, in two side views.

For increasing the electrical voltage of the battery 1, and consequently its power capacity, preferably multiple cell blocks 3-6 are electrically connected to one another one behind the other or in series. This may take place in optimum adaptation to the geometry of a vehicle to be equipped with such a battery, by differing mutual assignment of the cell blocks 3-6, as the schematic representations of FIGS. 8-10 show. In this case, the exemplary embodiment as shown in FIG. 8 corresponds to that of FIGS. 1, 3 and 5 to 7.

In a way corresponding to the exemplary embodiment as shown in FIG. 9, a battery 1 has in each case two cell blocks 3-6, which are arranged one above the other and next to one another and are electrically connected to one another in series in a way that is not represented.

The exemplary embodiment as shown in FIG. 10 shows four cell blocks 3-6 connected to one another in series to form a strand.

All of the batteries 1 with various mutual assignments of individual cell blocks 3-6 corresponding to the representations in FIG. 8 to FIG. 10 have the common feature that, on account of their space-saving cooling system and the associated compact type of construction of their cell blocks 3-6, they have relatively small overall dimensions, with a corresponding advantage during the arrangement in an electrically operated vehicle.

In the case of a particularly compact configuration of a battery 1 with only cell blocks 3-6 arranged one above the other, and consequently heat exchange pockets 19 parallel to one another, their connectors 25, 26 can be provided in a space-saving way coaxially one above the other in the region of an end-side side face of the battery 1 and be connected by way of a T-shaped branch 38 and 90° elbow 39 to common connection lines 40, 41, running parallel to them, in order to connect them by way of connectors 42, 43 provided on said lines to a circulating pump (not represented) and to an outer heat exchanger (not represented).

Cooling that is harmful to the battery cells 7 in rod form and their power capacity, for example during winter operation, can be prevented by a heating body 44, which is fastened to one of the connection lines and is electrically operated by way of a thermostat circuit, preferably in combination with a thermal insulation of the battery.

For the thermal insulation, an inner container 46, which is preformed from insulating material in the form of a box, is telescopically pushed into an outer container 45, which is formed for example from steel or an aluminum alloy and ensures the outer strength of the battery 1. For its outward closure, which is subsequently performed, an enclosing closure cap 47 is telescopically inserted in a sealing manner.

After pushing in, layer by layer, the cell blocks 3 to 6 together with heat exchange pockets 19, pressure distribution plates 29 and pressure pockets 28 into the inner container 46, the latter can be closed in a sealed manner by telescopically pushing in a closure cap 47 likewise consisting of insulating material. In this case, the electrical lines and the connection lines for the cooling medium are led through this closure cap 47 in a way that is not represented.

For a compact type of construction of the battery 1, and nevertheless very good thermal insulation, this inner container 46, with a wall thickness of for example only 5 mm, is produced from a particularly highly effective insulating material, which encloses a granular material 50, such as for example silica, and is put under a vacuum in the manner of a vacuum panel between an outer wall 48 and an inner wall 49.

Since such an insulating material cannot flex or bend without being destroyed, for the closure cap 47 to be produced in one piece cross-sectionally v-shaped bending grooves are provided in the inner layer 49 of the starting material, so that after completion of the closure cap 47 in box form a bending fold 51 respectively forms along such bending grooves, as is shown in FIG. 12.

Also formed from such insulating material is a closure cover 53, which is flange-mounted on the end side of the outer container 45 by means of screw bolts 52.

In order to prevent bending out of the wall 54, made as thin as possible, of the outer container 45 under the pressure of the pressure pockets 28 and 36 that ensures the inner bracing of the cell blocks 3-6, a flexurally rigid stiffening layer 56, for example of steel sheet or aluminum sheet, is provided parallel to the pressure pockets 28, 36 and between this wall 54 and the wall 55 of the thermally insulating inner container 46. Its flexural rigidity is produced by a profiling that corresponds to its layer thickness, is of a wavy form and has flattenings 57.

In order to prevent uneven pressing effects on the adjacent wall 55 of the inner container 46 being caused by this profiling, also pushed in between said profiling and the stiffening layer 56 is a pressure distribution plate 58, produced produced for example from plastic or an aluminum alloy.

List of Designations

1 Battery
2 Housing
3-6 Cell blocks
7 Rod cells
8 Gap
9-12 Rows
13, 14 Poles
15 Contact plate
16 Contact lug
17 Welding spots
18 Distance from the pole
19 Heat exchange pocket
20 Film edges
21, 22 Film walls
23, 24 Film continuations
25, 26 Connectors
27 Flow directing grid
28 Pressure pocket
29 Pressure distribution plate
30 Housing inner wall
31, 32 Supporting profiles
33, 34 Pocket continuations
35 2nd pressure distribution plate
36 Pressure pocket
37 End edge
38 T-branch
39 Elbow
40, 41 Connection lines
42, 43 Connectors
44 Heating body
45 Outer container
46 Inner container
47 Closure cap
48 Outer wall
49 Inner wall
50 Granular material
51 Bending fold
52 Screw bolts
53 Closure cover
54 Wall of the outer container
55 Wall of the inner container
56 Stiffening layer
57 Flattening
59 Pressure distribution plate

The invention claimed is:
1. A battery comprising:
a plurality of rod cells, each rod cell having a first end and a second end, each end having an end-side electrical contact; and
a plurality of cell blocks, each cell block defining a width of the battery, each cell block comprising
at least a first row of rod cells and a second row of rod cells, wherein each row is adjacent to another row, and in each row, a respective first rod cell adjacent to a respective second rod cell;
a first common contact plate for electrically connecting, on the first end of the plurality of rod cells, the end-side electrical contacts of the rod cells of one row with the end-side electrical contacts of the rod cells of another other row in parallel and in series, the first common contact plate being disposed onto the first end of each rod cell of the first row of rod cells and onto the first end of each rod cell in the second row of rod cells across an entire width of the battery;
a cooling element in thermally conducting contact with each row;
a pressure pocket for holding the respective rod cells in their respective positions, the pressure pocket being filled with a compressible pressure medium; and
a flat heat exchanger permitting a flow of a liquid heat transfer medium therethrough, the flat heat exchanger being in heat-conducting connection with the contact plate, the flat heat exchanger extending parallel to the first common contact plate,
wherein the flat heat exchanger comprises a film, the film comprising a plurality of flexible film walls defining a heat exchange pocket,
wherein the pressure pocket is separate from the heat exchange pocket, the pressure pocket is parallel to the heat exchange pocket and has a corresponding size to the heat exchange pocket.
2. The battery as claimed in claim 1,
wherein the flat heat exchanger is in direct contact with the first common contact plate, and
wherein the flat heat exchanger comprises a surface abutting against the first common contact plate, the surface comprises an electrically insulating material.
3. The battery as claimed in claim 1,
wherein the film comprises an inner layer and an outer layer,
wherein the outer layer comprises an electrically insulating material.
4. The battery as claimed in claim 1, wherein the first common contact plate extends over the entire length of two rows of rod cells parallel with each other,
further comprising a second common contact plate, the second common contact plate for electrically connecting, on the second end, the end-side electrical contacts of the rod cells of one row with the end-side electrical contacts of the rod cells of another other row in parallel and in series; the second common contact plate being disposed onto the second end of each rod cell of the first row of rod cells and onto the first end of each rod cell in the second row of rod cells.
5. The battery as claimed in claim 1, wherein the electrical end-side connectors are connected to the first common contact plate by spot laser welding using a scanner welding technique.

6. The battery as claimed in claim 5, wherein multiple welding spots are respectively provided for connecting the first common contact plate to the end-side electrical connectors.

7. The battery as claimed in claim 1, wherein the first common contact plate is punched from sheet metal and is arranged so that a punched burr is on a plate side facing away from the heat exchange pocket.

8. The battery as claimed in claim 4, wherein the respective rod cells are fastened the first common contact plate and the second common contact plate with a gap between the first common contact plate and the second common contact plate.

9. The battery as claimed in claim 1, wherein a flow directing grid is enclosed between a first film wall and a second film wall, the first film wall and the second film wall defining the heat exchange pocket.

10. The battery as claimed in claim 1, wherein a pressure distribution plate is arranged between the pressure pocket and the heat exchange pocket.

11. The battery as claimed in claim 1, further comprising a pressure plate, the pressure plate abutting against an end edge of the first common contact plate, the pressure plate extending perpendicularly to the first common contact plate and is braced by the pressure pocket.

12. The battery as claimed in claim 1, wherein the heat exchange pocket abuts against the first common contact plate, the heat exchange pocket comprising a connector for a liquid heat transfer medium to flow through the heat exchange pocket, the connector being perpendicular to a plane of the heat exchange pocket.

13. The battery as claimed in claim 1,
wherein the plurality of cell blocks are arranged stacked on each other;
wherein respective heat exchange pockets are provided between adjacent cell blocks; and
wherein a respective heat exchange pocket is disposed on an outside of the plurality of cell blocks.

14. The battery as claimed in claim 12,
wherein the plurality of cell blocks are arranged stacked on each other;
wherein respective heat exchange pockets are provided between adjacent cell blocks and are parallel to each other; and
wherein the respective connectors are provided on respective heat exchange pockets of the cell blocks and are arranged coaxially one above the other in a region of an end-side side face of the battery and are connected by respective connection lines to a common connection line running parallel to the respective connection lines, each respective connection line comprising a T-shaped branch or a 90° elbow.

15. The battery as claimed in claim 14, wherein an electrical heating body is provided on at least one of the respective connection lines.

16. The battery as claimed in claim 1,
wherein a respective first cell block is connected to a respective second cell block, the respective first cell block is enclosed in a thermally insulated battery housing,
wherein the housing comprises an inner container and outer container, the outer container having a greater load-bearing capacity than the inner container, the inner container comprising insulating material, the inner container being inserted within the outer container.

17. The battery as claimed in claim 16,
wherein the inner container has a first wall and the outer container has a second wall;
wherein a flexurally rigid stiffening layer is enclosed between the first wall and the second wall, the first wall and the second wall being parallel to the respective flat heat exchangers.

18. The battery as claimed in claim 17,
wherein the stiffening layer has a profile that corresponds to a layer thickness of the stiffening layer,
wherein a pressure distribution plate is arranged between the profile and an adjacent wall of the inner container.

19. The battery as claimed in claim 16, wherein the insulating material encloses a granular material under a vacuum in a manner of a vacuum panel between an outer wall and an inner wall.

20. The battery as claimed in claim 16, wherein a closure wall of the inner container forms part of a closure cap telescopically inserted in the battery.

21. The battery as claimed in claim 16, wherein a closure cover of the outer container encloses a granular material under a vacuum between an outer wall and an inner wall.

22. A battery comprising:
a plurality of cell blocks, each cell block defining a width of the battery, each cell block comprising
a plurality of rod cells, each rod cell having a positive pole and a negative pole, the plurality of rod cells arranged in rows and in alternating pole orientations;
a first common contact plate extending across the width of the battery, the first common contact for electrically connecting the plurality of rod cells in parallel and in series;
a cooling element in thermally conducting contact with each row; and
a pressure pocket for holding the plurality of rod cells in their respective positions, the pressure pocket being filled with a compressible pressure medium; and
a flat heat exchanger permitting a flow of a liquid heat transfer medium therethrough, the flat heat exchanger being in heat-conducting connection with the contact plate, the flat heat exchanger extending parallel to the first common contact plate,
wherein the flat heat exchanger comprises a film, the film comprising a plurality of flexible film walls defining a heat exchange pocket,
wherein the pressure pocket is separate from the heat exchange pocket, the pressure pocket is parallel to the heat exchange pocket and has a corresponding size to the heat exchange pocket.

* * * * *